United States Patent [19]
Dzik

[11] Patent Number: 5,877,743
[45] Date of Patent: Mar. 2, 1999

[54] LINE SMOOTHING TECHNIQUES

[75] Inventor: Steven Charles Dzik, Somerset, N.J.

[73] Assignee: Lucent Technologies Inc., Murray Hill, N.J.

[21] Appl. No.: 697,720

[22] Filed: Aug. 29, 1996

Related U.S. Application Data

[63] Continuation of Ser. No. 390,184, Feb. 17, 1995, abandoned.

[51] Int. Cl.[6] .................................................. G09G 5/36
[52] U.S. Cl. ........................................... 345/136; 345/133
[58] Field of Search ................................... 345/133, 137, 345/145, 136

[56] References Cited

U.S. PATENT DOCUMENTS

| | | | |
|---|---|---|---|
| 4,620,287 | 10/1986 | Yam | 345/136 |
| 5,010,500 | 4/1991 | Makkuni et al. | 364/521 |
| 5,042,075 | 8/1991 | Sato | 345/128 |
| 5,311,207 | 5/1994 | Kusumoto et al. | 345/173 |
| 5,345,546 | 9/1994 | Harada et al. | 395/142 |
| 5,454,043 | 9/1995 | Freeman | 382/168 |

OTHER PUBLICATIONS

Peter Karow, "Digital Typefaces", 1994, pp. 255–261.

Thomas Jr., George B. and Ross L. Finney, Elements of Calculus and Analytic Geometry, Addison–Wesley Pub. Co, 1981, pp. 88–93.

*Primary Examiner*—Steven J. Saras
*Assistant Examiner*—Matthew Luu

[57] ABSTRACT

Improved curve plotting techniques are disclosed for drawing a substantially smooth curve in real time, from a plurality of sampled points, as the points are sampled, on a point-by-point basis. The curve is substantially smooth in that it has a continuously changing slope of $G^1$ continuity, as opposed to a slope which changes in a discontinuous or stepwise manner. The curve plotting is performed by representing the x coordinates of the curve using a parametric equation $x=[a_x*(t^2)]+[b_x*t]+[c_x]$, and by representing the y coordinates of the curve using a second parametric equation $y=[a_y*(t^2)]+[b_y*t]+[c_y]$, wherein $a_x$, $a_y$, $b_x$, $b_y$, $c_x$, and $c_y$ comprise six unknown quantities, and t is a "dummy" valuable. The derivatives of the parametric equations are employed to calculate and to plot the smooth curve.

5 Claims, 6 Drawing Sheets

LINE SMOOTHING TECHNIQUES

This is a continuation of application Ser. No. 08/390,184 filed Feb. 17, 1995, now abandoned.

BACKGROUND OF THE INVENTION

1. Field of the Invention

This invention relates generally to interactive computing devices and, more specifically, to improved smooth curve generation techniques for use in conjunction with interactive computerized drawing systems.

2. Description of Prior Art

In many existing computerized drawing systems, a system user changes the position of a computer mouse or other pointing device on a substantially planar surface to create a drawing consisting of some combination of lines and curves. The drawing is displayed on some form of video display terminal, such as CRT display, an LCD display, or the like. The pointing device (i.e., the mouse) and the display are coupled to a computing device, such as a personal computer, a laptop computer, or the equivalent. The computer periodically samples the current position of the pointing device and uses these sampled position readings to plot the lines and curves drawn by the pointing device. The computing device cannot receive every point on the lines and curves, because the sampling interval is limited by the mouse. The plot is calculated by drawing straight lines between a plurality of successively sampled position readings of the mouse. Therefore, existing interactive curve drawing techniques utilize straight line segments between sample points, and these techniques do not interactively draw smooth curves.

Standard techniques for fitting smooth curves to a plurality of sampled position readings use higher-order polynomials. However, these approaches do not provide smooth curves in a user-interactive environment where the user would like to see lines and curves displayed as they are drawn, in real time. These techniques require a knowledge of position readings beyond the last sampled position of the pointing device. Since these position readings are unavailable until after the drawing has been completed, it is not possible to display smooth lines and curves in real time, as they are being drawn by the user.

Figure 1:
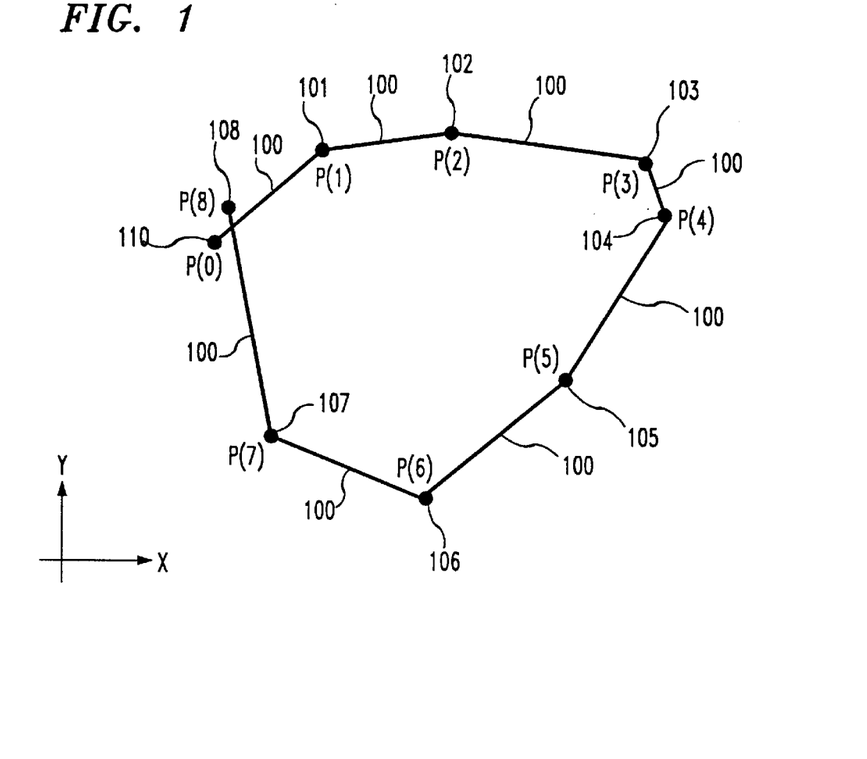
FIG. 1 is a two-dimensional drawing of a curve plotted from a plurality of sampled points as the points are sampled, using standard techniques set forth in the prior art.

In the example of FIG. 1, a system user has manipulated a pointing device (i.e., a computer mouse) to describe a substantially circular curve. The mouse position is periodically sampled, for example, at times t0, t1, t2, t3, t4, t5, t6, t7, and t8. At time t0, the mouse is at starting point P(0) 110; at time t1, the mouse is at point P(1) 101; at time t2, the mouse is at point P(2) 102; at time t3, the mouse is at point P(3) 103; at time t4, the mouse is at point P(4) 104; at time t5, the mouse is at point P(5) 105; at time t6, the mouse is at point P(6) 106; at time t7, the mouse is at point P(7) 107; and at time t8, the mouse is at point P(8) 108. Applying existing curve fitting methods to these sampled points in real time, as the sampled points are obtained, results in a curve 100 as shown in FIG. 1. Note that the curve 100 of FIG. 1 resembles a polygon, even though the user had manipulated the mouse in a circular manner.

A major shortcoming of existing curve plotting and curve drawing methods is that smooth curves cannot be drawn in a manner such that the effect of the most recently-sampled point is properly and fully considered. The curve that is drawn will lag the most currently sampled mouse position by at least one reading. The curves appear as if they consist of a plurality of line segments, when in fact a smooth arc was actually inscribed by the computer mouse. Using existing curve drawing and curve plotting methods, circular arcs appear as polygons, and curved arcs appear as a series of straight lines joined with sharp corners.

Smooth curves could be drawn if all of the sampled mouse positions were known beforehand, or if substantial parts of the curve were re-drawn every time the sampled mouse position changed. For example, using Bezier curves, once a new sampled mouse position point P(n) is taken, the entire curve must be recalculated (i.e., re-plotted or redrawn) from the starting point, i.e., P(0) 110. If B spline methods are used, once a new sampled mouse position point P(n) is taken, the future position of the mouse at sampled point P(n+1) must be known in order to draw a smooth curve. Therefore, using B spline methods, a smooth curve cannot be drawn in real time, as this curve is always one sampled point behind the most recently-sampled position of the mouse. This has been demonstrated to produce unacceptable results.

The mouse user expects to see a smooth curve on the video display terminal as the curve is traced by the computer mouse. What is needed is a method for interactively drawing (plotting) a smooth curve as each new sampled point is added to a sequence of sampled mouse positions, without any knowledge of the mouse position to be sampled next.

SUMMARY OF THE INVENTION

Improved curve plotting techniques are disclosed for drawing a substantially smooth curve in real time, from a plurality of sampled points, as the points are sampled, on a point-by-point basis. The curve is comprised of a plurality of curve segments, wherein each segment is plotted between a pair of consecutively-sampled points. The curve segments form a substantially smooth curve having a continuously changing slope of $G^1$ continuity, as opposed to a slope which changes in a discontinuous or stepwise manner. In the context, $G^1$ continuity refers to the fact that the first derivative of the curve segments (i.e., the slope of the curve segments) remains substantially continuously varying and exhibits no substantial discontinuities. The curve plotting is performed by representing the x and y coordinates of the curve using a second-order equation $f_x(t)$ for x as a function of t, and a second-order equation $f_y(t)$ for y as a function of t, where t is a "dummy" variable of the type used in conventional parametric equations, such that t may be conceptualized as representing time.

An nth sampled point provides a first set of sampled coordinates, and an (n+1)th second sampled point provides a second set of sampled coordinates. The nth sampled point is substituted into $f_x(t)$ and $f_y(t)$ to provide first and second solution equations, and the (n+1)th sampled point is substituted into the $f_x(t)$ and $f_y(t)$ to provide third and fourth solution equations. This insures physical continuity. Note that (n) and (n+1) are positive integers or natural numbers, wherein (n+1) represents the number of sample points taken, and n represents the number of patches (i.e,. curve segments) resulting from (n+1) sample points.

A fifth solution equation is formulated by evaluating the slope $m_1$ of the curve at the nth sampled point. Slope $m_1$ is equal to the derivative of the quadratic equation for y divided by the derivative of the first quadratic equation for x, wherein the derivatives of the quadratic equations are evaluated at the nth sampled point. A sixth solution equation is formulated by empirically specifying a value for a slope $m_2$, wherein $m_2$ is the slope of the curve to be plotted from point n to point n+1, and such that $m_2=m_1$, at point n. In this manner, six solution equations are used to solve for six unknown quantities, and this process is repeated for each of (n+1) sampled points, as the (n+1) sampled points are sampled.

DETAILED DESCRIPTION OF THE PREFERRED EMBODIMENT

Figure 2:
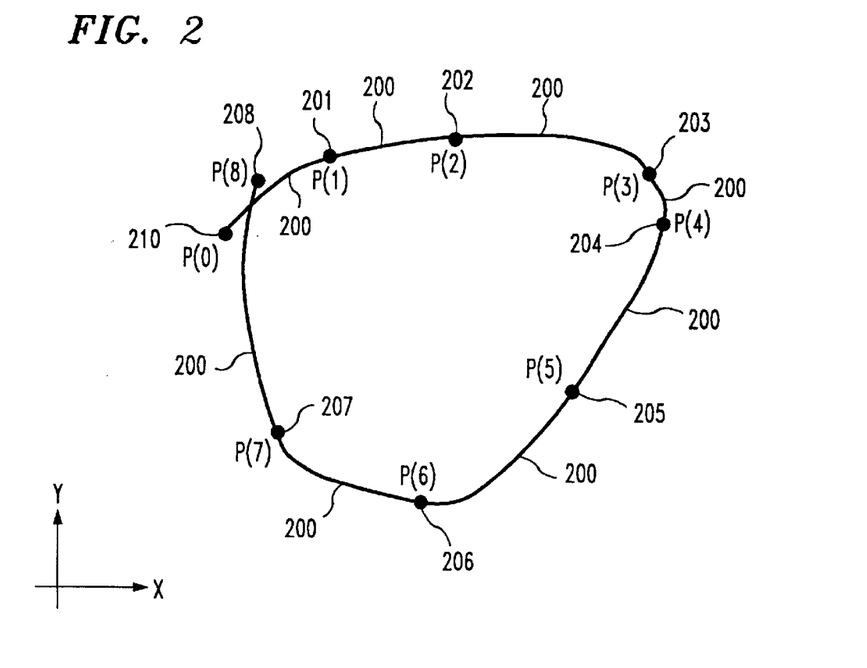
FIG. 2 is a two-dimensional drawing of a curve plotted from a plurality of sampled points, as the points are sampled, according to a preferred embodiment disclosed herein.

With reference to FIG. 2, improved curve drawing techniques are disclosed for drawing a substantially smooth curve f(x,y) 200 in real time, from a plurality of sampled points P(0) 210, P(1) 201, P(2) 202, P(3) 203, P(4) 204, P(5) 205, P(6) 206, P(7) 207, and P(8) 208, as the points are sampled, on a point-by-point basis. The curve f(x,y) 200 is substantially smooth in that it has a continuously changing slope m, as opposed to a slope which changes in a discontinuous or stepwise manner.

Figure 7A:
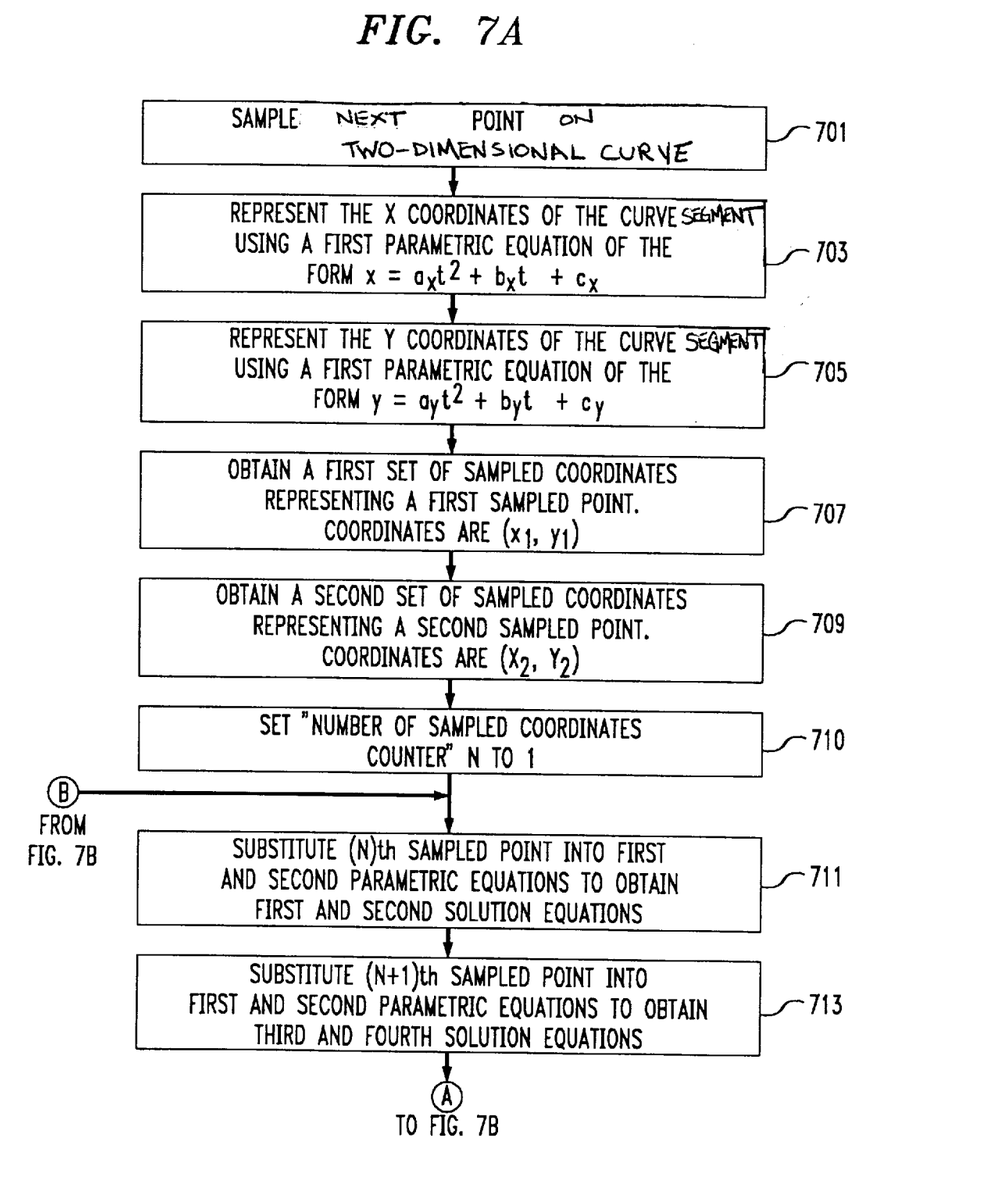
FIGS. 7A and 7B comprise a flowchart setting forth a preferred embodiment of a curve drawing method disclosed herein.
Figure 7B:
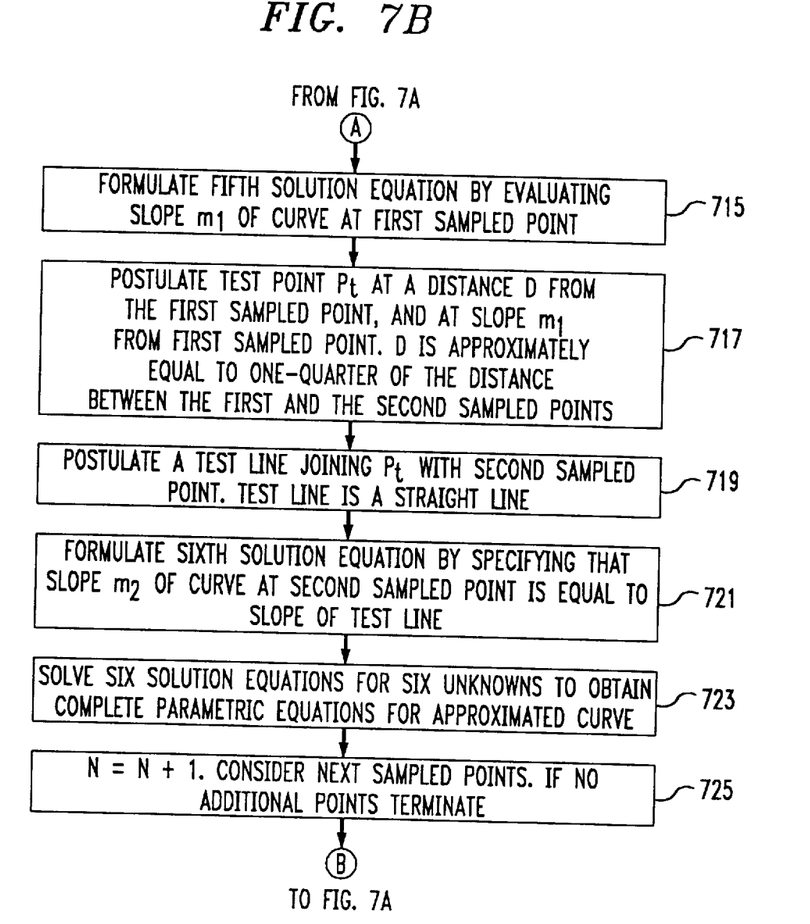

A preferred embodiment of the approximation technique disclosed herein utilizes the procedure of FIG. 7. At block 701, a point (n+1) representing a point on a two-dimensional curve is sampled. It is assumed that point (1, . . . n) on this two-dimensional curve have already been sampled and that the curve is already drawn to point n. In the operational environment of a personal computing device, this sampling step may involve sampling the position of a computer mouse on a substantially planar surface. At block 703, the x coordinates of the curve f(x,y) 200 are represented using a first parametric equation $x=[a_x*(t^2)]+[b_x*t]+[c_x]$, and at block 705, the y coordinates of the curve f(x,y) 200 are represented using a second parametric equation $y=[a_y*(t^2)]+[b_y*t]+[c_y]$, wherein $a_x$, $a_y$, $b_x$, $b_y$, $c_x$, and $c_y$ comprise six unknown quantities, and t is a "dummy" variable which is evaluated in the range between 0 & 1.

Figure 3:
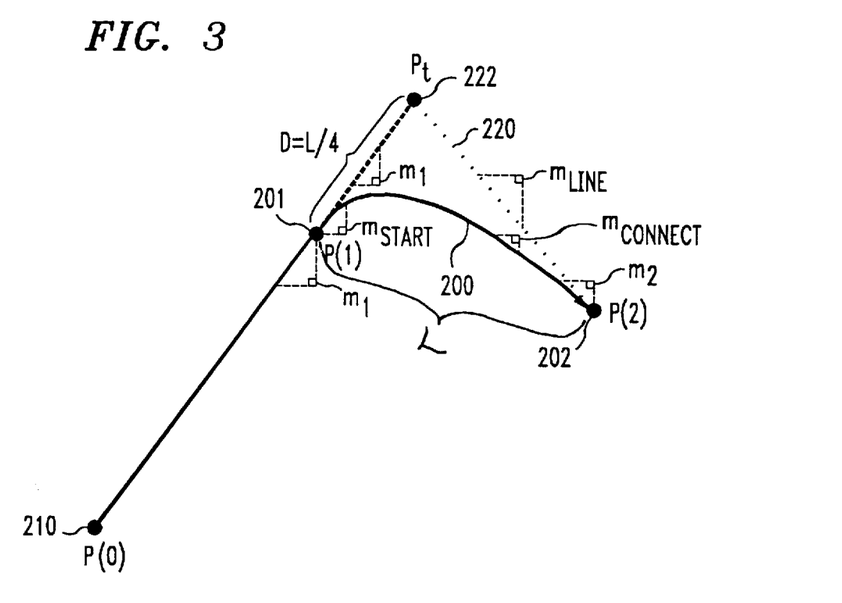
FIG. 3 is a two-dimensional drawing showing three sampled points for plotting a curve according to a preferred embodiment disclosed herein.

An nth sampled point P(1) 201 provides a first set of sampled coordinates $(x_1, y_1)$ (block 707), and an (n+l)th sampled point P(2) 202 provides a second set of sampled coordinates (x2, Y2) (block 709). At block 710, a counter N keeps track of the number of sampled coordinates processed by the program of FIG. 7. In the present case, the routine of FIG. 7 commences as soon as the first two mouse position points have been sampled (i.e., points, n and n+1, where n=1). These points are shown in FIG. 3 as P(0) 210, (point n-1), P(1) 201 (point n), and P(2) 202 (point n+1). At this time, counter N is initialized to a value of 1, signifying that a first pair of sampled coordinates, i.e., $(x_1, y_1)$, and $(x_2, y_2)$ corresponding to P(1) 201 and P(2) 202, will be processed to calculate a first portion of a curve to be plotted. Initially, when only two points have been sampled, i.e., P(0) 210 and P(1) 201, a straight line is plotted between the first two points. Therefore, the curve plotting algorithm of FIG. 7 effectively commences between the second and third points to be sampled, which are p(1) 210 and P(2) 202 (FIG. 3). Every time a new point is sampled, the plotted curve is extended. This extension is called a curve segment.

The nth (in this case, "first") sampled point P(1) 201 (FIG. 3) is substituted into the first and second parametric equations (block 711) to provide first and second solution equations, which are evaluated at t=0, and the (n+1)th (in this case, "second") sampled point P(2) 202 is substituted into the first and second parametric equations to provide third and fourth solution equations (block 713), wherein the third and fourth solution equations are evaluated at t=1.

A fifth solution equation is formulated by determining the slope $m_{start}$ of the curve segment between the nth and (n+1)th sampled points, (FIG. 3) as the curve approaches the (n)th sampled point which is point (p(1) 201 (FIG. 7, block 715). $m_{start}$ is defined as being equal to $m_1$ from the previous curve segment, as shown in FIG. 3, thereby providing $G_1$ continuity. Slope ml is equal to the derivative of the second parametric equation divided by the derivative of the first parametric equation, wherein the derivatives of the first and second parametric equations are evaluated at the first sampled point P(1) 201 at t=0 for that curve segment.

The next step in the program of FIG. 7 is to select a value for $m_2$. $m_2$ may be determined empirically and/or may be selected arbitrarily. However, according to a first preferred embodiment disclosed herein, a value for $m_2$ is selected by postulating a test point $P_t$ at a distance D and slope $m_1$ from the first sampled point (block 717). In accordance with one preferred embodiment, the distance D beyond the nth sampled point is selected to be equal to approximatley one-quarter the distance between the nth and (n+1)th sampled points, and at slope $m_1$ from the nth sampled point. A test line is postulated joining test point $P_t$ with the (n+1)th sampled point. The slope of the test line is equal to $m_2$.

Refer now to FIG. 3, which describes how such a test point $P_t$ is postulated. FIG. 3 illustrates the detailed geometric relationships between three sampled points P(0) 210, P(1) 201, and P(2) 202. A test point $P_t$ 222 is postulated at a distance D beyond the first sampled point P(1) 201. In a preferred embodiment disclosed herein, D is approximately equal to one-quarter the distance L between the first and second sampled points P(1) 201, and P(2) 202, respectively, and situated on a line having a slope of $m_1$ with reference to P(1) 201. In this manner, $m_1=m_2$ at the point P(1) 201 to provide a substantially smooth curve. A test line 220 (FIG. 3) is postulated joining test point Pt 222 with the second sampled point P(2) 202 (FIG. 7, block 719).

Returning now to FIG. 7, a sixth solution equation is formulated by specifying that the slope $m_2$ (FIG. 3) is equal to the slope of the test line (block 721). In this manner, six solution equations are used to solve for six unknown quantities (block 723). Next, counter N is incremented such that N=N+1 (block 725). If no additional sampled points remain to be considered, the program terminates. If additional sampled points remain to be considered, the program loops back to block 711.

An application of the above-described procedure is as follows. Assume for purposes of the present example that point P(2) 202 (FIG. 3) is the most recently-sampled mouse position reading, which was taken at time $t_2$, and that an additional sampled mouse position reading specifying point P(1) 201 was taken at time $t_1$ prior to time $t_2$. Accordingly, a curve 200 has been approximated from sampled mouse position reading P(0) 210 up to point P(1) 201. The techniques disclosed herein provide a smooth curve from point P(1) 201 to point P(2) 202 at time $t_2$, where $t_2$ represents the time at which point P(2) 202 was sampled. Note that $t_2$ occurs after $t_1$. The curve is plotted to point P(2) 202 in real time, as point P(2) 202 is sampled.

Pursuant to the aforementioned preferred technique for calculating $m_2$, the following procedures are performed. The slope ($m_{start}$) (FIG. 3) at the start of the curve 200 from p(1) 201 towards p(2) 202 is conceptualized as being the same as the slope ($m_1$) at the end portion of the curve 200 between P(0) 210 and P(1) 201 and nearest P(1) 201. The slope ($m_2$) at point P(2) 202 is defined to equal the slope $m_{line}$ of test line 220. The slope ($m_{connect}$) of that portion of curve 200 connecting point P(1) 201 and point P(2) 202 and nearest point P(2) 202 will approximate the slope ($m_2$) the curve must have at point P(2) 202. The curve 200 in FIG. 3 illustrates the geometry of point P(0) 210, point P(1) 201, point P(2) 202, slope $m_1$, slope $m_2$, slope $m_{start}$, slope $m_{connect}$, and slope $m_{line}$.

In the above example, the x and y coordinates of each sampled mouse position point, such as P(1) 201 and P(2) 202, are represented using separate equations for x and y. This computation yields two parametric equations for each sampled mouse position point, a first parametric equation setting forth x as a function of t, and a second parametric equation setting forth y as a function of t, wherein t is a dummy variable. In the present example, t has a value of 0 at the start of the curve segment, and a value of 1 at the end of the curve segment. The first parametric equation is of the form:

$$x = a_x * t^2 + b_x * t + c_x$$

and the second parametric equation is of the form:

$$y = a_y * t^2 + b_y * t + c_y$$

These parametric equations are evaluated at several equally-spaced points such as, for example, (t=0.25, 0.50, 0.75 and 1.00) from point P(1) 201 to point P(2) 202. The actual number of equally-spaced points may be adjusted based upon curve length. Note that, in the present example, point P(1) 201 is conceptualized as having a value of t=0 when the curve segment between P(1) 201 and P(2) 202 is being plotted. After the parametric equations are evaluated, straight lines are drawn between the equally-spaced points.

There are six unknown quantities in the above equations; namely, $a_x$, $a_y$, $b_x$, $b_y$, $c_x$, and $c_y$, so six solution equations must be employed to calculate values for these unknown quantities. First and second solution equations are provided by evaluating the aforementioned first and second parametric equations at a first point, such as point P(1) 201, or at an arbitrarily-selected curve starting point on curve 200 such as point P(0) 210.

Third and fourth solution equations are provided by evaluating the aforementioned first and second parametric equations at a second point, such as point P(2) 202, or at an arbitrarily-selected curve ending point on curve 200. The slope of the curve 200 at point P(1) 201 (i.e., $m_1$) provides a fifth solution equation, and the slope of the curve at point p(2) 202 (i.e., $m_2$) provides a sixth solution equation.

The values of the coefficients are:

$c_x$ = the value of x at P(1) $x_{P(1)}$ $c_y$ = the value of y at P(1) $y_{P(1)}$ $b_x$ = K * $d_x$/d+hd t evaluated at t=1 for d $_x$/d+hd t of the previous segment $b_y$ = K * $d_y$/d+hd t evaluated at t=1 for d $_y$/d+hd t of the previous segment.

$$a_x = ((x_{P(2)} - x_{P(1)}) - b_x)$$

$$a_y = ((y_{P(2)} - y_{P(1)}) - b_y)$$

K is the constant defined as follows:

$2*((x_{P(2)} - x_{P(1)}) - (y_{P(2)} - y_{P(1)}) * s_1)/d_y * (m_1 - m_2)$; where $d_y = by + 2*a_y$ from the previous segment.

Note that, if either $m_1$ or $m_2$ describe a perfectly vertical line, such a line has an infinite slope, and must be treated specially. Such special treatment could be accomplished by exchanging the x and y axes, or by using other well-known techniques.

The curve approximation method described in conjunction with FIG. 3 used a value for distance D approximately equal to L/4, where L is the distance between P(1) 210 and P(2) 201 along a straight line. However, other values for distance D may be employed, such as, for example, L/3 or L/5. The value used for distance D may be conceptualized as a curve tightness parameter. Values of D greater than L/4 will result in approximated curves having increased "looseness" or "floppiness" (refer to FIG. 4 for an example of such "floppiness"). Values of D less than L/4 will result in approximated curves having increased "tightness" (refer to FIG. 5 for an example of such "tightness"). Moreover, distance D may be varied to produce a certain desired amount of curvature to meet certain specific system applications. Curve tightness may be adjusted, such that each curve segment need not be based upon the same value of tightness parameter. As D approaches 0, the curve segments become straight lines. Setting D=0 yields the prior-art curve plotting method described above.

The above description presents one preferred method of calculating a value for $m_2$. However, $m_2$ may be determined using any procedure that provides a curve having a natural-looking and/or smooth curvature. $m_2$ is a free parameter and can take on any value.

Figure 4:
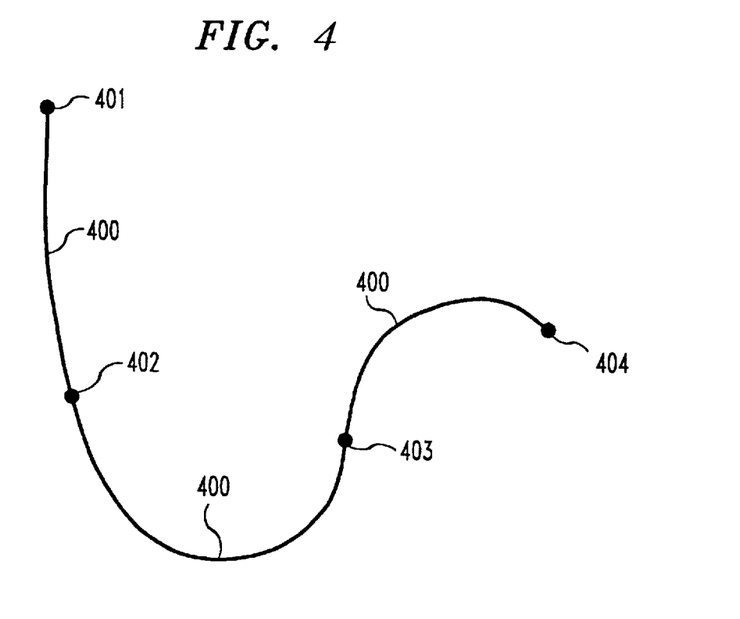
FIG. 4 shows an illustrative curve plotted using a relatively high value for a curve drawing tightness parameter.
Figure 5:
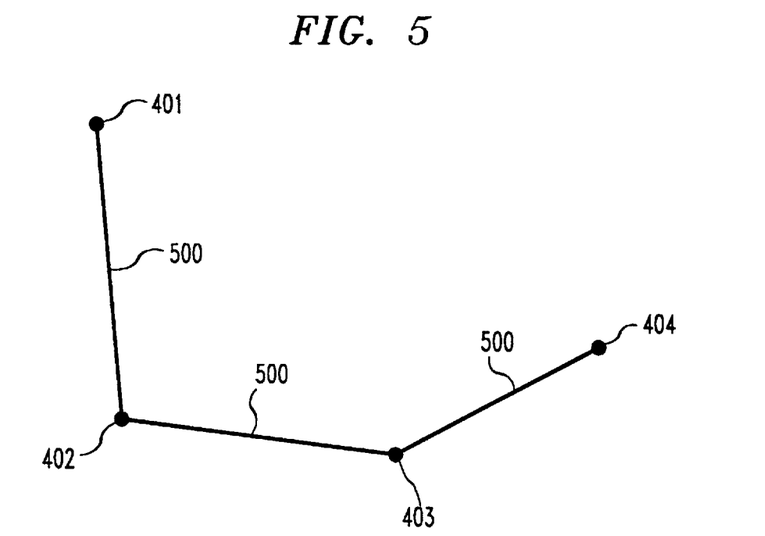
FIG. 5 shows an illustrative curve drawn using a relatively low value for a curve approximation tightness parameter.

FIG. 4 sets forth a curve 400 which has been plotted from sampled points 401, 402, 403, and 404, using a value for D substantially greater than L/4. As D increases, the curve 400 exhibits an additional tendency to "flop around" the sampled points. FIG. 5 sets forth a curve 500 which has been plotted from the same four sampled points 401, 402, 403, 404 of FIG. 4, but wherein the curve 500 was plotted using a value for D substantially less than L/4. As D is decreased, the curve 500 tends to straighten out, resembling the jagged, polygonal curves of prior art curve drawing methods.

Figure 6:
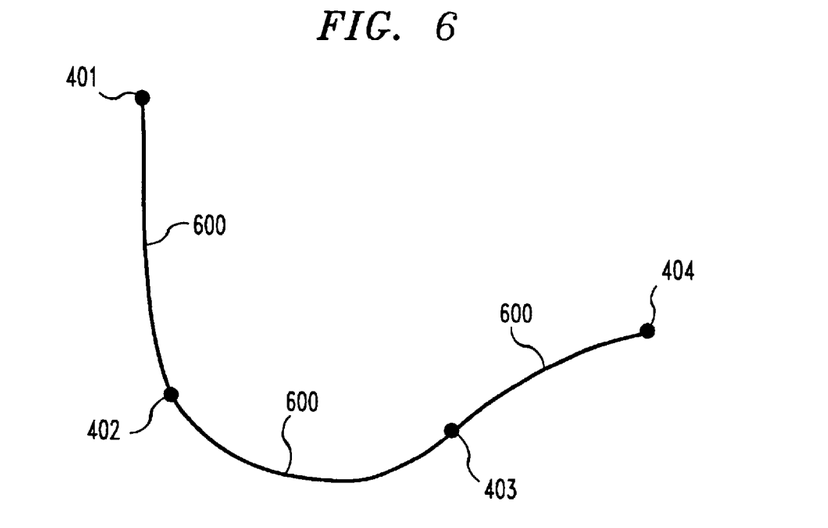
FIG. 6 shows an illustrative curve drawn using an optimized value for the curve drawn tightness parameter.

FIG. 6 displays a curve 600 plotted from the sampled points 401, 402, 403, and 404, using a value for D of approximately L/4. This value for D represents the optimum compromise between excessively straight and excessively floppy curves. In practice, useful values for D are in the range of about L/8 to L/2.

Figure 8A:
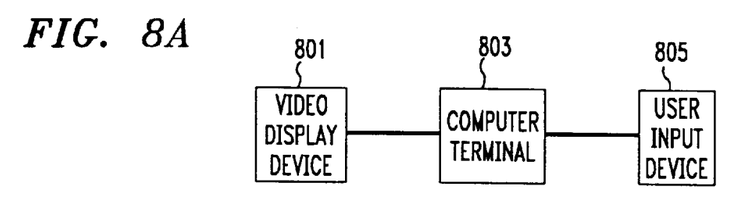
FIGS. 8A, 8B, 8C, and 8D are hardware block diagrams showing illustrative operational environments for executing the method of FIGS. 7A and 7B.
Figure 8B:
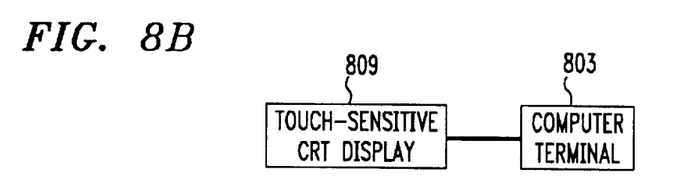

FIGS. 8A, 8B, 8C, and 8D set forth illustrative hardware configurations on which the techniques disclosed herein may be performed. FIG. 8A shows a computer terminal 803, such as a personal or laptop computer, coupled to a video display device 801 and a user input device 805. The video display device 801 could comprise a cathode-ray tube (CRT), an LCD display, or an LED display. The user input device 805 could comprise a keypad with cursor position keys, an array of potentiometers configured as a joystick, a computer mouse, or any other type of user input device known to those skilled in the art. FIG. 8B shows computer terminal 803 coupled to a touch-sensitive CRT display 809. This touch-sensitive display 809 accepts user input in the form of finger pressure and provides video output in the form of visual images.

Figure 8C:
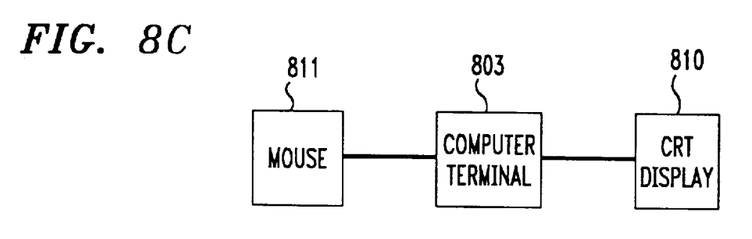
Figure 8D:
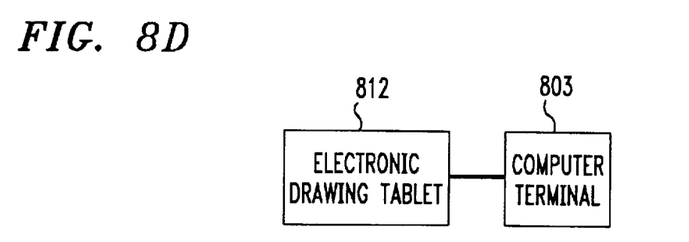

FIG. 8C shows a computer terminal 803 coupled to a computer mouse 811 and a CRT display 810. FIG. 8D shows a computer terminal connected to an electronic drawing tablet 812, which is a transducer for converting stylus pressure into electrical signals. The stylus may be, for example, a conventional pen, a conventional pencil, a wood or metal pointer, or the like. Electronic drawing tablet 812 may also include a visual display showing the path traced or inscribed by the stylus.

I claim:

1. A method for drawing a curve using a system having position indication means, visual display means, and calculating means; the method comprising the steps of:

a.) manipulating the position indication means in a manner so as to describe a curve;

b.) sampling the position indication means, as the position indication means is manipulated, to collect a first sampled point (n) and a second sampled point (n+1), where n+1 represents a number of sample points and n represents a number of curve segments resulting from the number of sample points n+1;

c.) representing x and y coordinates of the curve using parametric equations of forms $x = a_x t^2 + b_x t + c_x$ and $y = a_y t^2 + b_y t + c_y$, wherein $a_x$, $b_x$, $c_x$, $a_y$, $b_y$ and $c_y$ represent unknown variables to be solved in step (g) and t is a variable;

d.) substituting values for the first sampled point into equations of step (c.) to provide first and second solution equations for the unknown variables as a function of t, and substituting values for the second sampled point into the equations of step (c.) to provide third and fourth solution equations for the unknown variables as a function of t;

e.) formulating a fifth solution equation by evaluating a slope ml of the curve at the first sampled point, wherein $m_1$ is substantially equal to a derivative of the second solution equation divided by the derivative of the first solution equation; and f.) formulating a sixth solution equation by selecting a value for $m_2$ so as to provide a substantially smooth curve between the first and second sampled points; wherein $m_2$ is empirically specified as the slope of the curve to be drawn in step (h.) from the first sampled point n to the second sampled point n+1, such that $m_2$ is substantially equal to $m_1$ at the first sampled point n;

g.) solving for the unknown variables $a_x$, $_bx$, $c_x$, $a_y$, and $c_y$, in the first, second, third, fourth, fifth and sixth solution equations to calculate the curve to be drawn;

h.) drawing the curve calculated in step (q.) on the visual display means as the position means is being manipulated.

2. A method for drawing a curve as set forth in claim 1 wherein $m_2$ is determined a (a) postulating a first point $p_t$ at a distance D beyond the first sampled point and at a slope $m_1$ from the first sampled point, (b) postulating a test line $l_t$ joining Pt with the second sampled point, and (c) specifying that $m_2$ at the second sampled point is equal to the slope of $l_t$.

3. A method for drawing a curve as set forth in claim 2 wherein D is approximately equal to one-eighth to one-third of the distance between the first and second sampled points.

4. A method for drawing a curve as set forth in claim 2 wherein D is approximately equal to one-quarter of the distance between the first and second sampled points.

5. A method for drawing a curve as set forth in claim 1, wherein $c_x$ = a value of x at $P(1) = x_{P(1)}$;

$c_y$ = a value of y at $P(1) = y_{P(1)}$;

$b_x = K^* d_x/d + hd\ t$, evaluated at t=1 for $d_x/d + hd\ 1$ of a previous curve;

$b_y = K^* d_y/d + hd\ t$, evaluated at t=1 for $d_y/d + hd\ 1$ of the previous curve;

$$b_y = K^*(y_{P(2)} - y_{P(1)});$$

$$a_x = ((x_{P(2)} = x_{P(1)}) = b_x;$$

$$a_y = ((y_{P(2)} = y_{P(1)}) = b_y;$$

$$a_y = ((y_{P(2)} = y_{P(1)}) = b_y;$$

where K is a constant defined as:

$2^*((x_{P(2)} = xP(1)) = (y_{P(2)} = y_{P(1)})^* s_1)/dy^*(m_1 - m_2)$;

and $d_y = b_y + 2^* a_y$ from the previous curve.

* * * * *